Figure 1:
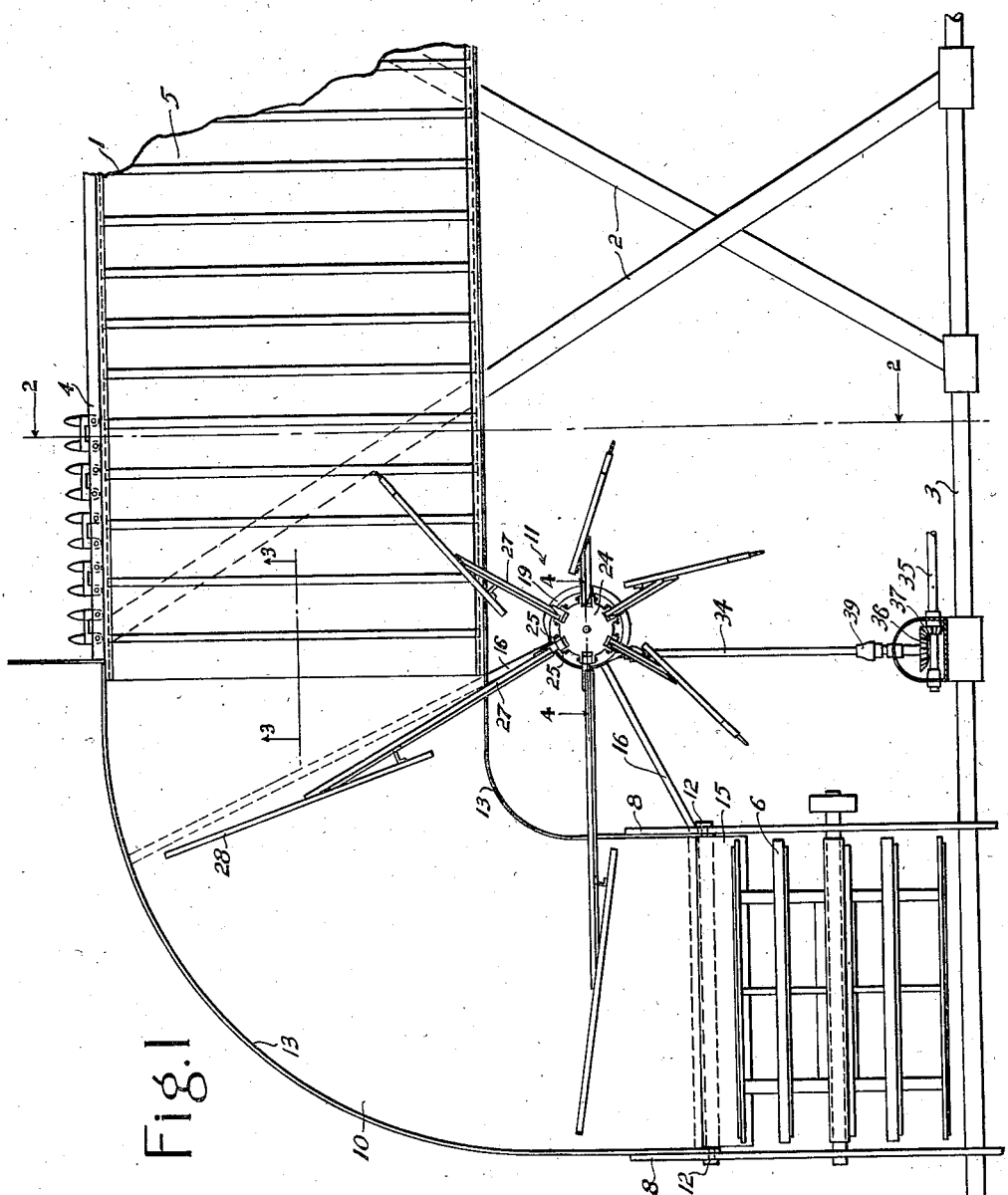

April 6, 1937. H. M. JOHNSTON 2,075,946
REAPER THRESHER MACHINE
Filed June 15, 1936 2 Sheets-Sheet 1

INVENTOR:
HOWARD M. JOHNSTON
BY ATTORNEY.

April 6, 1937. H. M. JOHNSTON 2,075,946
REAPER THRESHER MACHINE
Filed June 15, 1936 2 Sheets-Sheet 2
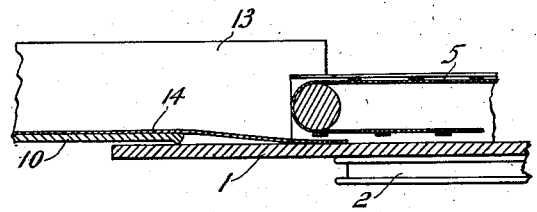
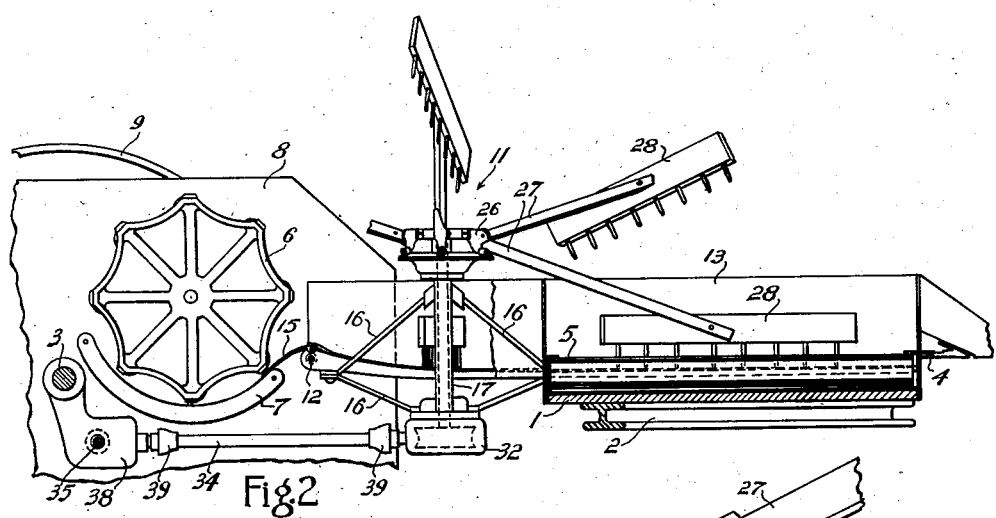
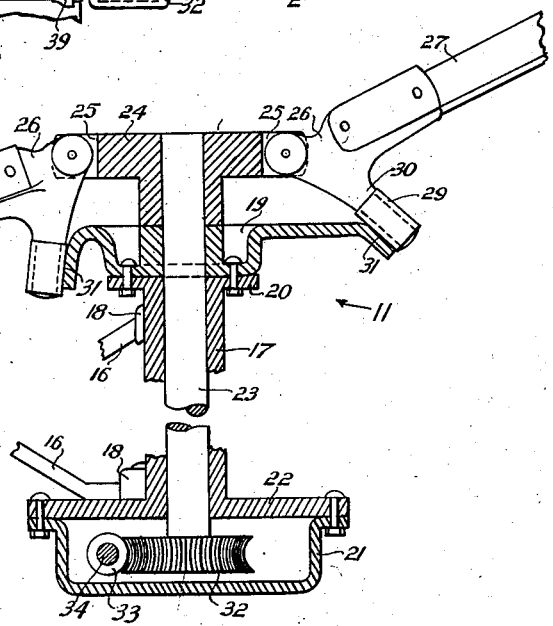
INVENTOR:
HOWARD M. JOHNSTON
BY ATTORNEY.

Patented Apr. 6, 1937

2,075,946

UNITED STATES PATENT OFFICE 2,075,946

REAPER-THRESHER MACHINE

Howard Milton Johnston, Toronto, Ontario, Canada, assignor to Massey-Harris Company, Limited, Toronto, Ontario, Canada Application June 15, 1936, Serial No. 85,313

6 Claims. (Cl. 56—123)

This invention relates to reaper-threshers and more particularly to the means for transferring the grain from the reaper table to and feeding it into the cylinder portion of the thresher.

In the usual construction the thresher cylinder is provided with a feeding table, with a conveyor thereon, pivotally arranged in front of the cylinder and at the outer end of and at right angles to the reaper table with its conveyor, usually of canvas. A beater, in the form of a rotating corrugated cylinder, is arranged across and at the outer end of the reaper table and a similar beater across the thresher feeding table adjacent to the thresher cylinder. These beaters somewhat arrange and direct the grain in its travel to the thresher cylinder. The abrupt right angled change in the direction of travel of the grain tends to entangle the grain and destroy the normal alignment which the grain assumes as it falls on the reaper table. Frequently, owing to the condition of the uncut grain, entangled masses or bundles appear on the table. The action of the beaters tends to compact these bundles and makes them more difficult of reception by the thresher cylinder. At best these bundles are objectionable from the point of view of even feeding and efficient threshing.

The object of the present invention is to provide improved means, for conveying the grain from the reaper table and feeding it to the thresher cylinder, which carries the grain along an arcuate path to the thresher cylinder without permitting substantial interruption of its normal alignment, which has but one driven part—a set of raker arms, which feeds the grain evenly to the cylinder, which tends to disentangle bundles of grain before they enter the cylinder, which is economical in power consumption, which as a unit is automatically raised or lowered as the reaper table is adjusted to varying cutting heights, and which provides a ready arrangement of the separate parts thereof into a compact form for shipment or transport.

The invention will now be described with reference to the accompanying drawings in which Figure 1 is a plan view of the relevant parts of a reaper-thresher embodying the invention, Figure 2 is a section on line 2—2 of Figure 1, Figure 3 is a slightly enlarged section on line 3—3 of Figure 1, and Figure 4 is an enlarged section on line 4—4 of Figure 1.

In the drawings, 1 is a reaper table of a reaper-thresher machine pivotally supported by beams 2 from the main axle 3 of the machine and provided with the usual adjustable positioning means (not shown) for vertically adjusting the table and cutting bar 4 adjacent one side thereof to meet various cutting conditions, 5 is an endless conveyor mounted on the table 2, 6 a thresher cylinder and 7 a thresher concave mounted between supporting plates 8, and 9 the main wheel of the machine mounted on axle 3. All of the aforementioned members form part of the usual construction of reaper-thresher machines.

The novel feeding arrangement of the present invention comprises an arcuate feeding table 10 automatically adjustable with the reaper table and a rake arm feeder 11 associated therewith.

The feeding table 10 is pivotally mounted at one end as at 12 to the supporting plates 8 adjacent the cylinder 6, its other end resting on the reaper table 1 and having sliding engagement therewith as shown in Figure 3. The table 10 may be provided with metal sheeting side walls 13 and a metal sheeting top covering 14 which may extend a short distance under the conveyor 5 at that end of the table. A narrow curved metal strip 15 is pivotally secured along one side to the pivoted end of table 10, the other side resting on the concave 7 to complete the grain path to the threshing cylinder.

The rake arm feeder 11 is carried by the feeding table 10 and is supported in the position shown by means of supports 16 secured to the bottom of table 10. The feeder 11 comprises a hollow post 17 provided with lugs 18 to which the supports 16 are secured, a cam casting 19 secured to an upper flange 20 on post 17, a gear box casing 21 secured to a lower flange 22 on post 17, a central shaft 23 extending into the gear box 21 and through the post and cam, and a rake head 24 keyed to the top of shaft 23. The rake head 24 is formed with a plurality of pairs of bracket supporting lugs 25, each pair of which pivotally carries a rake arm bracket 26, to which is bolted a rake arm 27 carrying a rake 28. A cam engaging roller 29 is mounted on a lower projection 30 formed on each bracket 26. The cam 19 is provided with a roller engaging surface 31, a portion of which is in a substantially vertical plane as shown in Figures 1 and 4, the remaining portion being at a slight angle to a horizontal plane.

Driving means is provided for the shaft 23 and consists of a worm wheel 32 mounted on the lower end of shaft 23 in gear box 21, a worm 33 meshing therewith, a worm shaft 34, and a driven shaft 35 having driving engagement with the worm shaft 34 by means of a pair of bevel gears 36 and 37 carried by the shafts 34 and 35 respectively and housed in a gear box 38 supported from the main axle 3 as shown. The shaft 35 is driven in any suitable manner from the power plant of the machine. The worm shaft 34 is provided with two universal joints 39 to accommodate angular movement of the shaft 34 with respect to the driven shaft 35.

Operation of the feeding arrangement will be readily apparent. The revolving rakes 28, by reason of the cooperating rake arm brackets 26 and cam surface 31, are arranged to engage grain on the feeding table 10 at a point closely adjacent the end of conveyor 5 and to remain in engagement therewith until they reach a point approximately one or two inches from the cylinder 6, when they rise abruptly to clear the cylinder and other parts of the machine.

The feeding table 10, by reason of its pivotal mounting and sliding engagement with the reaper table 1, automatically adjusts itself to the various operating positions of the reaper table. The rake arm feeder 11, being carried by the feeding table 10, is always in correct relation thereto.

The bolted connections between the cam casting 19 and flange 20, the brackets 26 and rake arms 27, the rake arms 27 and rakes 28 may be through slotted holes in the respective parts so that the relative positions of the rakes and feeding table may be varied to meet different conditions; for instance, in the case of light or heavy grain, it may be necessary to adjust the rakes as to depth of engagement in the swath of grain.

There is thus provided a flexible feeding arrangement including but one driven operating shaft and a feed table which is free from complicated conveying mechanism, thus permitting easy accessibility to the cylinder and concave for repairs and adjustments. Moreover, the one way sweeping motion of the rakes eliminates the trailing, tangling or returning of grain as often occurs in cross conveyors.

I claim:

1. A reaper-thresher machine comprising a reaper table having a grain conveyor, a thresher cylinder, an arcuate table adapted to direct grain in an uninterrupted path from the reaper table to the cylinder and a rake arm feeder adjacent said arcuate table arranged to uniformly move grain along said path from the reaper table conveyor to the said thresher cylinder.

2. A reaper-thresher comprising a reaper table, a revolving grain conveyor thereon, a thresher cylinder, unitary means for directing grain in its undisturbed normally arranged swath in an uninterrupted path from said conveyor to said cylinder and a rake arm feeder to move said grain swath along said path.

3. In a reaper-thresher machine including a reaper table and a thresher cylinder, means for transferring grain from the reaper table to the thresher cylinder comprising an arcuate table one end of which is slidingly mounted on the reaper table and the other end of which has a pivotal support closely adjacent the thresher cylinder, and a rake arm feeder carried by said arcuate table and having a plurality of revolving rakes arranged to have successive cooperative engagement with grain delivered to said arcuate table from the reaper table.

4. In a reaper-thresher machine including a reaper table and a thresher cylinder, means for transferring grain from the reaper table along an arcuate path to the thresher cylinder comprising a feed table, one end of which is slidingly mounted on the reaper table and the other end of which has a pivotal connection adjacent the periphery of the thresher cylinder, a rake arm feeder carried by said feed table and having a plurality of rakes arranged to have successive engagement with grain on the feed table, and means for revolving said rakes.

5. In a reaper-thresher machine including a reaper-table and a thresher cylinder, means for transferring grain from the reaper table along an arcuate path to the thresher cylinder comprising a feed table, one end of which is slidingly mounted on the reaper table and the other end of which has a pivotal connection adjacent the periphery of the thresher cylinder and a rake arm feeder carried by said feed table comprising a hollow post, a shaft within the post having a rake head keyed thereto, a casting having a cam surface secured to said post, rake arm brackets pivotally mounted in said rake head and having cooperating rollers adapted to engage said cam surface, rake arms secured to said brackets, and means for driving said shaft to rotate said rake head.

6. A reaper-thresher machine as defined in claim 5 wherein the means for driving said shaft comprises a worm wheel mounted on the shaft, a worm engaging said worm wheel, a worm shaft, said worm shaft having universal joints therein, and a driven shaft having a driving connection with the worm shaft.

HOWARD MILTON JOHNSTON.